3,769,325
OXIDATION OF ALPHA ARYL ALCOHOLS
Donald M. Fenton, Anaheim, Calif., assignor to Union
Oil Company of California, Los Angeles, Calif.
No Drawing. Filed Dec. 10, 1970, Ser. No. 97,033
Int. Cl. C07c 45/16, 69/76, 67/00
U.S. Cl. 260—476 R
21 Claims

ABSTRACT OF THE DISCLOSURE

A method for the oxidation of alpha aryl alcohols or ethers thereof to carbonyls, i.e., aldehydes, ketones or esters, is disclosed. The reaction comprises oxidation of the alpha aryl alcohol or ether under mild conditions comprising a temperature of about 30° to 300° C. and a pressure from 1 to about 500 atmospheres, sufficient to maintain a liquid phase reaction system. The product is produced by self-oxidation of the alpha aryl oxy reactant or by oxidation in the presence of an olefin. The catalyst for this reaction is a Group VIII noble metal which is complexed with a biphyllic ligand, typically palladium or ruthenium complexed with triphenylphosphine. Reaction in the presence of a strong acid or base will produce an ester of an aromatic acid and carbinol. Side reactions such as decarbonylation can be suppressed by performing the reaction in the presence of carbon monoxide or an alkali metal hydroxide. Dehydration of the alcohol can also be reduced by the presence of an alkali metal hydroxide in the reaction medium.

DESCRIPTION OF THE INVENTION

This invention relates to a method for the preparation of aromatic carbonyl compounds and in particular relates to a method for the oxidation of alpha aryl oxy compounds, i.e., alcohols or ethers to aldehydes, ketones or esters.

It has been discovered that a Group VIII noble metal complexed with a biphyllic ligand will catalyze the oxidation of alpha aryl alcohols or ethers thereof to produce aldehydes, ketones or esters. The catalyst apparently lowers the activation energy necessary for this conversion to a sufficient degree that the alpha aryl oxy compounds can undergo self-oxidation to produce an alkyl aromatic hydrocarbon and the carbonyl compound or can be oxidized by a hydrocarbon olefin which is reduced to a more saturated state by the reaction. The carbonyl product produced by this oxidation is typically an aldehyde or a ketone, depending upon the substitution of the hydroxyl bearing of the alpha aryl oxy reactant.

When the reaction is performed in the presence of a strong acid or base, however, the oxidation can yield an ester of the alpha aryl carboxylic acid and the alpha aryl carbinol. This reaction, therefore, provides selectivity for the oxidation of alpha aryl alcohols or ethers thereof to a variety of carbonyl compounds having the same number of carbons, including aldehydes, ketones and esters.

The alpha aryl oxy compound which can be oxidized by this reaction can be any alpha, mono- or bicyclic aromatic alcohol having from about 7 to about 25 carbons and can have hydrocarbon groups on the aromatic and/or aliphatic substituent of the alcohol. The aromatic substituent can, in general, be any phenyl, naphthyl or alkyl substituted derivative thereof having up to about 4 alkyl groups dependent thereon and these alkyl groups can have from 1 to about 18 carbons. Similarly, the aliphatic substituents of the alcohol, i.e., the other groups on the hydroxyl bearing carbon of the reactant alcohol can be alkyl with a total of 1 to about 18 carbon atoms per alkyl group.

Examples of suitable alcohols thus include benzyl alcohol, alpha naphthyl carbinol, beta naphthyl carbinol, tolyl carbinol, xylyl carbinol, pseudocumyl carbinol, cumenyl carbinol, o-ethylphenyl carbinol, p-amylphenyl carbinol, m-dodecylphenyl carbinol, 2,6-dimethylnaphthyl carbinol, 6-dodecylnaphthyl carbinol, 4,6,7-triethylnaphthyl-1-carbinol, alpha-phenyl ethanol, alpha-tolyl propanol, alpha-naphthyl pentanol, alpha-phenyl dodecanol, alpha-xylyl heptanol, 3-phenylpropyn-3-ol, 3-alpha-naphthylbut-1-yn-3-ol, 5-tolyldodec-2-yn-5-ol, 4-cumyldodecan-4-ol, etc.

Ethers of the aforementioned alcohols can also be used as benzyl ether, di(naphthylmethyl)ether, di(tolylmethyl)ether, di(xylylmethyl)ether, tolylmethyl naphthylmethyl ether, di(alpha-phenylethyl)ether, di(alpha-tolylpropyl) ether, etc.

The catalyst of the invention comprises a Group VIII noble metal which is preferably in complex association with a biphyllic ligand. A biphyllic ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands can comprise organic compounds having at least about 3 carbons and containing arsenic, antimony, phosphorus or bismuth in a trivalent state. These ligands are known in the art and, accordingly, are not part of the essence of the invention. Of these, the phosphorus compounds, i.e., the phosphines, are preferred; however, the arsines, stibines and bismuthines can also be employed. Typical of the suitable ligands are those having the following structure:

$$E(R)_3$$

wherein:

E is trivalent phosphorus, arsenic, antimony or bismuth; and

R is the same or different alkyl having 1 to 18 carbons, cycloalkyl having 4 to 18 carbons and/or aryl having 6 to 18 carbons. Examples of which are methyl, butyl, nonyl, cyclopentyl, cyclohexyl, cyclodecyl, amylcyclohexyl, phenyl, tolyl, xylyl, 2-phenyl-4-butyloctyl, tetramethylphenyl, etc. Preferably at least one R is aryl, e.g., phenyl, tolyl, xylyl, etc., preferably having 6 to 9 carbons and, most preferably, the ligand is triaryl.

Examples of suitable biphyllic ligands having the aforementioned structure and useful in my invention are the following:

trimethylphosphine,
triethylarsine,
triethylbismuthine,
triisopropylstibine,
dioctylcycloheptylphosphine,
tricyclopentylphosphine,
tricyclohexylphosphine,
ethyldiisopropylstibine,
tricyclohexylphosphine,
methyldiphenylphosphine,
methyldiphenylstibine,
triphenylphosphine,
triphenylbismuthine,
tri(o-tolyl)phosphine,
phenyldiisopropylphosphine,
phenyldiamylphosphine,
ethyldiphenylphosphine,
phenylditolylphosphine,
xylyldiphenylarsine,
trixylylstibine,
cyclopentyldixylylstibine,
dioctylphenylphosphine,
tridurylphosphine,
trixylylbismuthine, etc.

Of the aforementioned, the aryl phosphines, preferably the diarylphosphines and, most preferably, the triarylphosphines (e.g., triphenylphosphine) are employed because of the increasing activity of the phosphines with increasing aromaticity.

The Group VIII noble metal may be ruthenium, rhodium, palladium, osmium, iridium or platinum. Palladium and ruthenium are preferred for their greater activity. A catalytic quantity of the metal is used (e.g., 0.002–2% of the reaction medium) and the metal can be added in any convenient manner such as a soluble salt, complex, acid or oxide or salt. Preferably the metal is added as a salt such as a halide (chloride, bromide( fluoride, iodide), nitrate nitrite, $C_1$ to $C_{10}$ carboxylate, e.g., acetate, propionate, butyrate, valerate, benzoate, octanoate, etc. Examples of useful Group VIII noble metal sources are rhodium nitrate, platinum nitrate, palladium chloride, rhodium fluoride, palladium hydroxide, palladium cyanide, osmium sulfate, rhodium sulfite, rhodium carbonate, palladium carbonate, platinum propionate, ruthenium acetate, etc. Examples of suitable complexed sources are osmium carbonyl, ruthenium pentacarbonyl, potassium osmium chloride, osmium dipyridyl chloride, potassium ruthenium fluoride, rhodium carbonyl, iridium hydride triphenylphosphine, potassium rhodium fluoride, palladium nitroso chloride, chloroplatanic acid, etc. The particular source of the metal or element not being part of the essence of the invention since the metal from such widely varied sources will nevertheless still form a complex with the aforementioned biphyllic ligand.

The Group VIII metal may be complexed with the above-described biphyllic ligand before being introduced into the reaction medium or the complex may be formed "in situ" by simply adding a compound of the metal and the biphyllic ligand directly into the reaction medium. In either case, it is generally preferable that the quantity of biphyllic ligand be in excess (e.g., 10–300% of that stoichiometrically required to form a complex with the Group VIII metal. The complex has from 1 to about 5 moles of biphyllic ligand per atom of the metal and other components such as hydride, or soluble anions such as sulfate, nitrate, $C_1$–$C_5$ carboxylates (e.g., acetate, propionate, isobutyrate, valerate, etc.), halide etc., may be, but need not be, included in the complex catalyst of this invention. These components may be incorporated in the catalyst by the formation of the catalyst complex from a Group VIII metal salt of the indicated anions.

The reaction is performed under liquid phase conditions and may be performed in a liquid organic solvent, i.e., a liquid in which the reactants and the catalyst are soluble. The liquid should also be inert to the reactants, catalyst and products under the reaction conditions. Suitable solvents include, for example, hydrocarbons, ketones, esters and ethers. Examples of hydrocarbon solvents are pentane, hexane, heptane, isooctane, dodecane, naphtha, cyclohexane, indane, benzene, toluene, xylene, durene, pseudocumene, Tetralin, etc. Examples of ketones are acetone, diethyl ketone, diisopropyl ketone, methyl-n-amyl ketone, cyclohexanone, etc. Examples of ethers are the alkyl and aryl ethers such as diisopropyl ether, di-n-butyl ether, ethylene glycol diisobutyl ether, methyl o-tolyl ether, diethyl ether, diethylene glycol diethyl ether, triethylene glycol diethyl ether, tetraethylene glycol dimethyl ether, etc.

Various esters can also be employed as solvents such as methyl acetate, ethyl acetate, isopropyl acetate, ethyl propionate, sec.-butyl acetate, isobutyl acetate, ethyl n-butyrate, n-butyl acetate, isoamyl, acetate, n-amyl acetate, isoamyl n-butyrate, diethyl oxalate, glycol diacetate, isoamyl isovalerate, methyl benzoate, ethyl benzoate, methyl salicylate, n-propyl benzoate, n-dibutyl oxalate, etc.

The reaction may be performed at relatively low temperatures, e.g., 30° to 300° C. and preferably 150° to 250° C. and at low pressures, e.g., to 1 to 500 atmospheres, preferably 1 to 100 atmospheres, absolute pressure, sufficient to maintain liquid reaction conditions.

The reaction as thus described comprises the self oxidation of the alpha aryl alcohol in accordance with the following equation:

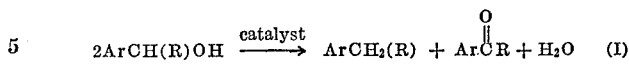

(I)

As previously mentioned, the oxidation can also be directed to the production of an ester of an alpha aryl carboxylic acid and an aryl carbinol. This is achieved by the incorporation of a strong acid or base in the reaction medium. In the presence of the strong acid or base, the reaction proceeds as follows, presumably by further reaction of the intermediate aldehyde:

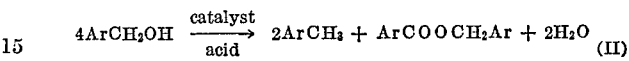

(II)

The reaction can also be modified to produce greater yields of the alpha aryl carbonyl compound by using a hydrocarbon olefin as the oxidant and the reaction thus proceeds as follows:

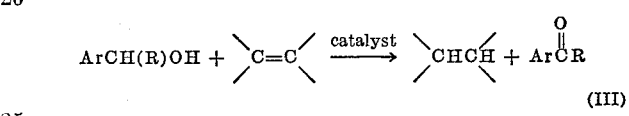

(III)

Various acids or bases can be employed for directing the oxidation to an ester of an alpha aryl carboxylic acid in accordance with the Reaction II above. Suitable acids should be soluble in the reaction medium and acids having some hydrocarbon solubility are therefore preferred. In addition, the acid should be relatively strong, having a high dissociation constant. Acids which meet these requirements are the various sulfonic acids having up to about 12 carbons such as the alkyl sulfonic acids having from 1 to about 12 carbons, cycloalkyl sulfonic acids from 5 to about 8 cyclic carbons, and monocyclic aryl sulfonic acids having from 6 to about 12 carbons. Examples of the sulfonic acids include ethane sulfonic, isopropane sulfonic, butane sulfonic, pentane sulfonic, nonane sulfonic, decane sulfonic, 2-ethylhexane sulfonic, cyclopentyl sulfonic, cyclohexyl sulfonic, methylcyclopentane sulfonic, cycloheptane sulfonic, amylcyclohexyl sulfonic, benzene sulfonic, toluene sulfonic, xylene sulfonic, cumene sulfonic, ethylbenzene sulfonic, pseudocumene sulfonic, p-isobutylbenzene sulfonic, 3,5-diamylbenzene sulfonic acids, etc. Suitable bases which will cause production of the esters of carboxylic acids and alpha aryl alcohols can be any alkali metal hydroxide, e.g., sodium, lithium, potassium or cesium hydroxide. The presence of such a base is also advantageous since it decreases the formation of unsaturated hydrocarbons by suppressing the dehydration of the alpha aryl alcohol reactant.

When employed, the acid or base should be present in a sufficient concentration to direct the oxidation for the formation of the ester of the alpha aryl carboxylic acid, or, for the base, to inhibit the dehydration of the alcohol reactant. Suitable concentrations in the reaction medium comprise from about 0.001 to about 1 molar, preferably from 0.01 to about 0.1 molar, quantities of the acid or base.

The oxidation can also be conducted in the presence of a hydrocarbon olefin to thereby increase the yields of carbonyl product obtained based on the alpha aryl alcohol reactant. Various hydrocarbon olefins having from 2 to about 20 carbons can be employed for this purpose including the alkenes such as ethylene, propylene, butene, pentene, isobutene, hexene, heptene, octene, isooctene, etc., the diolefins such as butadiene, pentadiene, octadiene, decadiene, etc.

The reaction is preferably performed under anhydrous conditions with reaction media containing less than 10, preferably less than 5, and, most preferably, less than 2 weight percent water. To maintain the reaction anhydrous, water formed during the reaction can be continuously or intermittently removed by suitable methods. During the processing, portions of the reaction medium can be removed and dehydrated by distillation and returned to the reaction zone. Alternatively, the reaction can be discontinued when the water content of the medium becomes excessive, e.g., about 5 to 10 weight percent. In a preferred embodiment, the water can be continuously removed by its distillation during the reaction, and, if desired, a suitable additive which forms a water azeotrope can be added to facilitate this distillation. The azeotrope former should be inert to the reactants, products and catalyst under the reaction conditions. Suitable agents are hydrocarbons such as benzene, toluene, etc. or substituted hydrocarbons such as propylene chloride.

Carbon monoxide can also be maintained in the reaction zone to inhibit the decarbonylation of the products and thereby enhance the yield of the desired aromatic carbonyl product. Accordingly, the reaction can be run in the presence of a gas phase comprising from 10 to 100 percent, preferably from 50 to 100 percent carbon monoxide, at the aforementioned pressures.

The reaction may be carried out in a batch or in a continuous process. In the batch process, the reactants catalyst and solvent, when employed, are charged to the reaction zone and the reaction is performed until a substantial amount or all of the reactant alcohol has been converted. One or more of the reactants can be continuously charged during this batch processing or some of the products can be continuously withdrawn during the conversion. The continuous introduction of the reactant alcohol and the continuous withdrawal of a crude reaction product containing the aromatic carbonyl results in continuous processing. When aldehydes are produced by the reaction, it is desirable to minimize the residence time of the aldehyde in the reaction zone to avoid its decarbonylation. This can be achieved in batch processing by periodic removal of the product at frequent intervals. The continuous processing is preferable in this regard since the product can be continuously removed, coincident with its formation.

The crude reaction product removed from the oxidation can be treated in a conventional manner to recover the products, e.g., by solvent extraction, distillation, crystallization, etc. The reaction medium remaining after removel of the alpha aryl carbonyl product can be recycled to the reaction zone together with any of the catalysts and unconverted alpha aryl alcohol which are separated during the product recovery.

The following examples will serve to illustrate the present mode of practice of the invention and to illustrate results obtainable thereby.

Example 1

A reactant mixture comprising 15 milliliters benzyl alcohol, 1 gram palladium chloride bis triphenylphosphine, 3 grams triphenylphosphine and 50 milliliters octanoic acid is introduced into a 250 milliliter flask which is equipped with a Dean-Stark trap. The flask is heated to reflux temperature and maintained under gentle refluxing for a period of 16 hours. Following the refluxing period, the flask contents are distilled to recover a mixture of 6.4 percent benzene, 50.1 percent toluene and 16.2 percent benzaldehyde.

Example 2

The reaction is repeated by the introduction of 100 milliliters benzyl alcohol, 1 gram palladium chloride bis triphenylphosphine and 3 grams triphenylphosphine into the reaction flask. After refluxing for several hours, the contents are distilled to recover 3 milliliters of water, 13 grams toluene, 16 grams benzaldehyde and 2 grams benzene.

When the experiment is repeated with substitution of triphenyl arsine for the triphenylphosphine, a similar reaction can be obtained.

Example 3

The reaction flask is charged with a mixture of 1 gram palladium chloride bis triphenylphosphine, 0.1 gram toluene sulfonic acid, 3 grams triphenylphosphine and 100 milliliters benzyl alcohol. The mixture is heated to reflux and maintained under gentle reflux conditions for several hours. Thereafter, the contents are distilled to recover a distillate comprising 90 percent toluene, 7 percent benzaldehyde and 3 percent benzene. The flask contents after distillation contained 40 percent benzaldehyde, 2 percent benzyl alcohol and 58 percent benzylbenzoate, resulting from the esterification of the benzoic acid product with the reactant benzyl alcohol. The distillate also contained 6 grams of water.

When the experiment is repeated with substitution of tritolylphosphine for the triphenylphosphine, a similar reaction can be obtained.

Example 4

The reaction flask is charged with 75 milliliters alpha methylbenzyl alcohol, 0.5 gram palladium chloride bis triphenylphosphine and 3 grams triphenylphosphine. The flask contents are heated to reflux temperature and maintained at refluxing conditions for 24 hours. On completion of the refluxing period, the flask contents are distilled to recover 27 grams of a distillate which contained 18 milliliters of an organic fraction comprising 5 milliliters ethylbenzene, 10 milliliters styrene, 1 milliliter benzene and 0.5 milliliter acetophenone. The flask residue contained 20 grams acetophenone, 10 grams styrene, 10 grams ethylbenzene and 5 grams benzene.

When the experiment is repeated with substitution of alpha naphthyl carbinol for the alpha methylbenzyl alcohol, similar conversion to naphthyl carbinal can be obtained.

Example 5

A steel bomb is charged with 0.5 gram ruthenium trichloride, 3 grams triphenylphosphine, 30 milliliters alpha methylbenzyl alcohol and 1 gram potassium hydroxide. The bomb is closed and ethylene is introduced to a pressure of 800 p.s.i.g. The bomb is rocked and the contents are heated to 150° C. and maintained at that temperature for 2 hours, then heated to 225° C. and maintained at that temperature for an additional 2 hours. Upon completion of this reaction, the contents of the bomb are cooled and removed to discover 10 grams of acetophenone product.

When the experiment is repeated with substitution of alpha tolyl dodecanol for the alpha methylbenzyl alcohol, similar conversion to alpha phenyl dodecanol can be obtained.

Example 6

The bomb is charged with 1 gram of a complex of $PdO_2$ and triphenylphosphine, 3 grams triphenylphosphine, 20 milliliters 1-octene and 50 milliliters benzyl alcohol. The bomb is pressured to 100 p.s.i.g. with nitrogen and heated to and maintained at 200° C. for 2 hours. The bomb contents are analyzed and found to contain benzene, toluene, benzaldehyde, dibenzyl ether and octane.

Example 7

The bomb is charged with 0.5 gram ruthenium trichloride, 1 gram rhodium hexacarbonyl bistriphenylphosphine, 3 grams triphenylphosphine, 0.5 gram potassium hydroxide and 50 milliliters benzyl alcohol. The bomb is pressured to 300 p.s.i.g. with ethylene and heated to and maintained at 150° C. for two hours, then at 225° C. for an additional two hours while rocking to agitate its contents. The bomb contents are analyzed to find 5 grams benzylbenzoate, 6 grams benzene, 0.5 gram toluene, 12 grams benzaldehyde and a small amount of propiophenone.

Example 8

The bomb is charged with 50 milliliters benzyl alcohol, 1 gram bistriphenylphosphine palladium chloride, and 3 grams triphenylphosphine and pressured to 800 p.s.i.g. with carbon monoxide. The bomb contents are heated to and maintained at 230° C. for two hours while rocking the bomb to agitate its contents. The bomb contents are analyzed and found to contain 10 grams toluene, 10 grams benzaldehyde. No benzene is detectable, thereby demonstrating the inhibition effect of carbon monoxide on the decarboxylation of the benzaldehyde product.

When the experiment is repeated in the presence of 50 milliliters σ-xylene, substantially the same results are obtained.

Example 9

A flask of 100 milliliter capacity is fitted with a Dean-Stark trap and charged with 39 grams dibenzyl ether, 0.5 gram ruthenium trichloride and 3 grams triphenylphosphine. The flask contents are heated to and maintained at reflux temperature for 24 hours. The resulting distillate is a mixture of benzene, toluene and benzaldehyde and the flask contents are chiefly benzaldehyde.

When the reaction is repeated with substitution of di(alpha tolylpropyl)ether for the dibenzyl ether, similar conversion to 1-methyl-4-propyl benzene and alpha tolylpropanal can be obtained.

The invention has been illustrated by the preceding examples which are intended solely to teach a mode of practice of the invention. It is not intended that the invention be unduly limited by this illustration. Instead, it is intended that the invention be defined by the reagents, conditions and steps, and their obvious equivalents set forth in the following claims.

I claim:

1. A method for the preparation of an alpha aryl carbonyl compound selected from the class consisting of aldehydes, ketones and esters which comprises contacting a reactant consisting essentially of an alpha mono- or dicyclic aryl alkanol having from 7 to about 25 carbons with a soluble salt, complex, acid or oxide of a Group VIII noble metal in a complex with from 1 to about 5 moles per atom of a Group VIII noble metal of a biphyllic ligand having the following structure:

$$E(R)_3$$

wherein:

E is trivalent phosphorus, arsenic, antimony or bismuth; and

R is the same or different alkyl having 1 to 18 carbons, cycloalkyl having 4 to 18 carbons or aryl having 6 to 18 carbons;

maintaining the reactant substantially anhydrous, at a temperature from 30° to 300° C. and at a pressure from 1 to about 500 atmospheres, sufficient to maintain liquid phase conditions and to effect entirely self-oxidation of the alpha aryl alcohol in the absence of oxygen to said carbonyl compound.

2. The method of claim 1 wherein said Group VIII noble metal is a salt, complex, acid or oxide of palladium or ruthenium.

3. The method of claim 2 wherein said biphyllic ligand has at least 2 aryl groups.

4. The method of claim 1 wherein said alpha aryl alcohol is benzyl alcohol.

5. The method of claim 2 wherein said biphyllic ligand is triphenylphosphine.

6. The method of claim 1 wherein said contacting is effected in the presence of a sulfonic acid having from 1 to about 12 carbons comprising an alkyl sulfonic acid, monocyclic aryl sulfonic acid or cycloalkyl sulfonic acid having 5 to about 8 cyclic carbons.

7. The method of claim 1 wherein said contacting is effected in the presence of an alkali metal hydroxide at a concentration from about 0.001 to about 1.0 molar.

8. The method of claim 7 wherein the concentration of said alkali metal hydroxide is from 0.01 to about 0.1 molar.

9. The method of claim 6 wherein said sulfonic acid is present at a concentration from about 0.001 to about 1 molar.

10. The method of claim 9 wherein said sulfonic acid is present at a concentration from 0.01 to about 0.1 molar.

11. The method of claim 1 wherein said contacting is performed in the presence of a reaction medium containing less than 10 weight percent water.

12. The method of claim 11 wherein said contacting is performed in the presence of a reaction medium containing less than 5 weight percent water.

13. The method of claim 12 wherein said contacting is performed in the presence of a reaction medium containing less than 2 weight percent water.

14. The method of claim 1 wherein carbon monoxide is maintained in the gas phase of the reaction zone at a concentration of from 10 to 100 percent.

15. The method of claim 14 wherein said concentration of carbon monoxide is from 50 to 100 percent.

16. The method of claim 1 wherein said catalyst is palladium chloride bis-triphenylphosphine.

17. The method of claim 1 wherein the temperature of said contacting is maintained from 150° to 250° C.

18. The method of claim 1 wherein said contacting is effected in the presence of a complex between ruthenium and triphenylphosphine.

19. The method of claim 1 wherein said temperature is maintained from 150° to 250° C.

20. The method of claim 1 wherein said pressure is maintained from 1 to about 100 atmospheres.

21. A method for the preparation of an alpha aryl carbonyl compound selected from the class consisting of aldehydes, ketones and esters which comprises contacting a reactant mixture consisting essentially of an alpha mono- or dicyclic aryl alkanol having from 7 to about 25 carbons and a hydrocarbon alkene or alkadiene having from 2 to about 20 carbons with a soluble salt, complex, acid or oxide of a Group VIII noble metal in a complex with from 1 to about 5 moles per atom of Group VIII noble metal of a biphyllic ligand having the following structure:

$$E(R)_3$$

wherein:

E is trivalent phosphorus, arsenic, antimony or bismuth; and

R is the same or different alkyl having 1 to 18 carbons, cycloalkyl having 4 to 18 carbons or aryl having 6 to 18 carbons;

maintaining the reactants at a temperature from 30° to 300° C. and at a pressure from 1 to about 1000 atmospheres, sufficient to maintain liquid phase conditions and effect oxidation of the alpha aryl alcohol in the absence of oxygen to said carbonyl compound.

References Cited

Blum et al.: J. C. S. (B) (8) 1969, pp. 1000–4.

LORRAINE A. WEINBERGER, Primary Examiner

R. D. KELLY, Assistant Examiner

U.S. Cl. X.R.

260—469, 592, 599